(12) United States Patent
Shi et al.

(10) Patent No.: US 8,767,039 B2
(45) Date of Patent: Jul. 1, 2014

(54) METHOD AND APPARATUS FOR SHOOTING PANORAMA

(75) Inventors: Huiqin Shi, Guangdong (CN); Wei Huang, Guangdong (CN); Zhao Zhang, Guangdong (CN)

(73) Assignee: ZTE Corporation, Shenzhen (CN)

(*) Notice: Subject to any disclaimer, the term of this patent is extended or adjusted under 35 U.S.C. 154(b) by 6 days.

(21) Appl. No.: 13/260,023

(22) PCT Filed: Oct. 15, 2010

(86) PCT No.: PCT/CN2010/077797
§ 371 (c)(1),
(2), (4) Date: Apr. 16, 2012

(87) PCT Pub. No.: WO2011/153767
PCT Pub. Date: Dec. 15, 2011

(65) Prior Publication Data
US 2012/0274738 A1    Nov. 1, 2012

(30) Foreign Application Priority Data
Jun. 7, 2010 (CN) .......................... 2010 1 0194820

(51) Int. Cl.
H04N 7/00      (2011.01)
H04N 5/232     (2006.01)
(52) U.S. Cl.
CPC ................................ *H04N 5/23238* (2013.01)
USPC .......................................................... 348/36

(58) Field of Classification Search
CPC ................................................. H04N 5/23238
See application file for complete search history.

(56) References Cited

U.S. PATENT DOCUMENTS

| | | | |
|---|---|---|---|
| 6,885,392 B1 * | 4/2005 | Mancuso et al. | 348/36 |
| 2006/0023090 A1 * | 2/2006 | Takata et al. | 348/239 |
| 2007/0200926 A1 | 8/2007 | Chianglin | |
| 2007/0297693 A1 | 12/2007 | Lee | |
| 2008/0143820 A1 | 6/2008 | Peterson | |
| 2008/0158342 A1 * | 7/2008 | Jeong et al. | 348/36 |

FOREIGN PATENT DOCUMENTS

| | | |
|---|---|---|
| CN | 1589050 A | 3/2005 |
| CN | 101093348 A | 12/2007 |
| CN | 101589613 A | 11/2009 |

* cited by examiner

*Primary Examiner* — Sath V Perungavoor
*Assistant Examiner* — Kate Luo
(74) *Attorney, Agent, or Firm* — Christopher L. Parmelee; Walker & Jocke (57) ABSTRACT

The present invention discloses a method and an apparatus for shooting a panorama, so as to solve the problems in the prior art that images with high quality cannot be obtained in the shooting process of a panorama and the shot images cannot be directly combined into a panorama without post-shooting processing. The method comprises the steps of: calculating, when previewing an image to be shot which is not the first shot image in a panorama, an overlapping degree of a joining region between the image to be shot and a shot image; and shooting the image to be shot when the overlapping degree reaches a set condition. The present invention also discloses an apparatus for shooting a panorama.

10 Claims, 5 Drawing Sheets

METHOD AND APPARATUS FOR SHOOTING PANORAMA

TECHNICAL FIELD OF THE INVENTION

The present invention relates to the field of electronic equipment, and in particular to a method and an apparatus for shooting a panorama.

BACKGROUND OF THE INVENTION

With the growing update of digital technologies, electronic equipment with a high-performance camera is spreading gradually. Simultaneously, the chip technology of the current stage becomes mature day by day, and the electronic equipment with a higher processing speed and a graphics coprocessor is slowly entering into people's life. The application of all these technologies improves people's working efficiency, and is convenient for study and life of people.

The electronic equipment with a function of taking pictures provides very practical application for users to record exciting moments, especially recently, the electronic equipment realizes a panorama shooting function so that the users are able to shoot wide photos anytime and anywhere. However, the panorama shooting function widely applied by the present electronic equipment is not very satisfactory.

The panorama shooting function has rather high requirements on the shooting process and material photos, and the same colour, brightness, resolution and the like are required. The panorama shooting function of the present electronic equipment excessively depends on the post-shooting software stitching processing, and intervene to the shooting process is only to prompt the users by means of "Side Image" or assist the users to exactly find views. The shot material photos are non-uniform in colour and serious in distortion, therefore the post-shooting stitching processing cannot be properly performed with a little regret.

The prior art has shortcomings that there is no technical solution which is able to obtain images with high quality during the shooting process of the electronic equipment and thus the shot photographs cannot be directly combined into a panorama without post-shooting processing.

SUMMARY OF THE INVENTION

The present invention provides a method and an apparatus for shooting a panorama, for solving the problems in the prior art that images with high quality cannot be obtained in the shooting process and the images which are not performed with post-shooting process cannot be directly combined into a panorama.

The embodiments of the present invention provide a method for shooting a panorama, comprising the following steps:

calculating, when previewing an image to be shot which is not the first shot image in a panorama, an overlapping degree of a joining region between the image to be shot and a shot image; and shooting the image to be shot when the overlapping degree reaches a set condition.

The embodiments of the present invention also provide an apparatus for shooting a panorama, comprising:

an image preview unit, for previewing an image to be shot under a panorama shooting mode;

an image processing unit, coupled with the image preview unit, for calculating, when the image to be shot has an adjacent shot image, an overlapping degree of a joining region between the image to be shot and the shot image;

an image shooting unit, coupled with the image processing unit, for shooting the image to be shot when the overlapping degree reaches a set condition; and an image stitching unit, for combining shot images into a panorama.

The present invention has the advantages as follows.

According to the technical solution provided by the embodiments of the present invention, in the process of shooting a panorama, when previewing an image to be shot, if the image to be shot has an adjacent shot image, the overlapping degree between data of a boundary region of the image to be shot and data of a boundary region of the shot image is calculated; when the overlapping degree reaches the set condition, the image to be shot is shot. During the process, the high-speed processing capability of the electronic equipment is fully utilized, the overlapping degree between the image to be shot and the adjacent shot image is calculated while the image to be shot is previewed, and the shooting is performed when the overlapping degree reaches the set condition, therefore, the images with high quality can be obtained during shooting. After finishing shooting, as the joining regions of the obtained images are overlapped, the shot images without post-shooting processing can be directly combined into a panorama by simple overlapping.

DETAILED DESCRIPTION OF EMBODIMENTS

A panorama is generated by combining a series of photographs which are shot continuously. According to the embodiments of the present invention, during the process of shooting two adjacent photographs, after the previous photograph is shot, data of a boundary region of the previous shot photograph are stored; and when shooting the next photograph to be shot, during the process of previewing the image to be shot, the boundary region of the image to be shot is stored in real time; the overlapping degree of data of two boundary regions is calculated according to stored data of the two boundary regions; and the movement direction of the camera is prompted to the user; the user moves the camera and shoot the image to be shot when the overlapping degree reaches the set condition. By means of the above, during the process of shooting the photographs, the boundary regions of two adjacent shot photographs are overlapped, and the photographs can be directly combined into a panorama in a post-shooting stage by simple overlapping without any need to process the shot photographs.

The technical solution provided by the embodiments of the present invention can be applied on electronic equipment such as a mobile terminal, a camera, a video camera with the function of taking pictures and the like. As the mobile terminal is spreading day by day and can provide various abundant applications, it can replace and even surpass multimedia electronic equipment with single functions; therefore, the embodiment of the present invention takes the mobile terminal as the objects for describing.

The embodiment of the present invention is described below with reference to the accompanying drawings.

Figure 1:
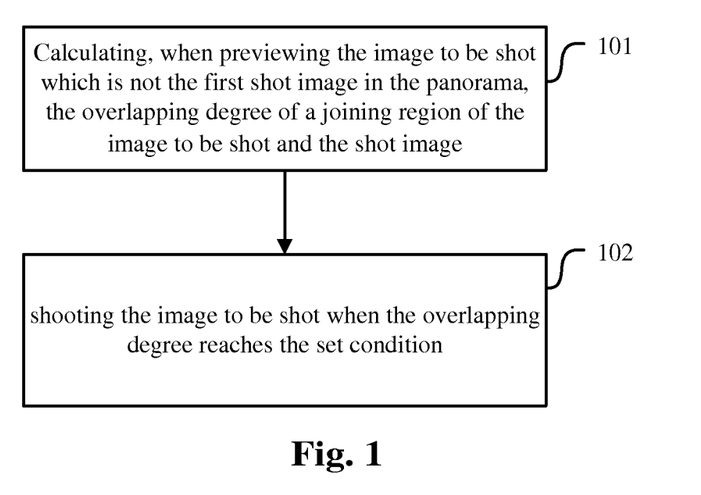
FIG. 1 shows a schematic diagram of an implementing flow of a method for shooting a panorama according to an embodiment of the present invention.

FIG. 1 shows a schematic diagram of an implementing flow of a method for shooting a panorama according to an embodiment of the present invention. As shown in the figure, the following steps are included during the shooting of a panorama.

Step 101: when an image to be shot which is not the first shot image in a panorama is previewed, an overlapping degree of a joining region between the image to be shot and a shot image is calculated.

When shooting a panorama, a user sets the mobile terminal to be a panorama shooting mode. After the first photograph is shot, the mobile terminal obtains the next image to be shot utilizing a camera, and the user previews the image to be shot through a preview frame.

When the user is previewing the image to be shot, the mobile terminal stores data of the boundary region of the image to be shot.

The mobile terminal obtains previously stored data of the boundary region of an adjacent shot image, and transmits the image data to a central processing unit via a bus. The central processing unit utilizes an image recognition method to calculate the overlapping degree of the joining region between the image to be shot and the shot image.

Step 102: when the overlapping degree reaches a set condition, the image to be shot is shot.

When the overlapping degree does not reach the set condition, the mobile terminal prompts the movement direction of the camera to the user. The user moves the camera according to the prompt of the mobile terminal and previews the image to be shot after the movement of the camera. The mobile terminal recalculates the overlapping degree of the joining region between the boundary region of the image to be shot after the movement and the shot image.

When the mobile terminal shoots photographs in a digital zooming manner, the mobile terminals also stores the part which is cut and not displayed because of the digital zooming. When calculating the overlapping degree between the data of the boundary region of the image to be shot and the data of the boundary region of the shot image, the cut and non-displayed part can be used as hidden overlapping region for contrast and reference, which fully utilizes the high pixel and panoramic region of the mobile terminal and makes the algorism more accurate.

When the overlapping degree reaches the set condition, the mobile terminal prompts the user to shoot, and drives the camera to shoot the photograph according to the shooting instruction returned by the user, and stores the shot image.

When all the photographs are shot, the user overlaps the shot images stored in the mobile terminal and combines the shot images into a panorama.

The adjacent shot image in the embodiment of the present invention is selected from a plurality of shot images. In the detailed implementation, alignment directions can be classified into horizontal alignment and longitudinal alignment, wherein the horizontal alignment indicates that the upper boundaries and the lower boundaries of all the shot images are respectively on the same horizontal line; and the longitudinal alignment indicates that the left boundaries and the right boundaries of all the shot images are respectively on the same vertical line. During the shooting process, it is defaulted that there is only one alignment direction, for example, setting the alignment direction as the horizontal alignment, and the shooting direction is from the left to the right, during the shooting process, the previous shot image is automatically taken as the adjacent shot image, the data of the right boundary region of the shot image are stored as the data of the reference image of the next shot photograph, and when the next image is previewed, the data of the left boundary region of the previewing image are stored as the data of the previewing image.

In another implementation, the user can select the adjacent shot image and the alignment direction, that is, the user can change the alignment direction after shooting the photographs on the original set alignment direction. so that one image can be selected from the shot images as the adjacent shot image.

Embodiment 1

Figure 2:
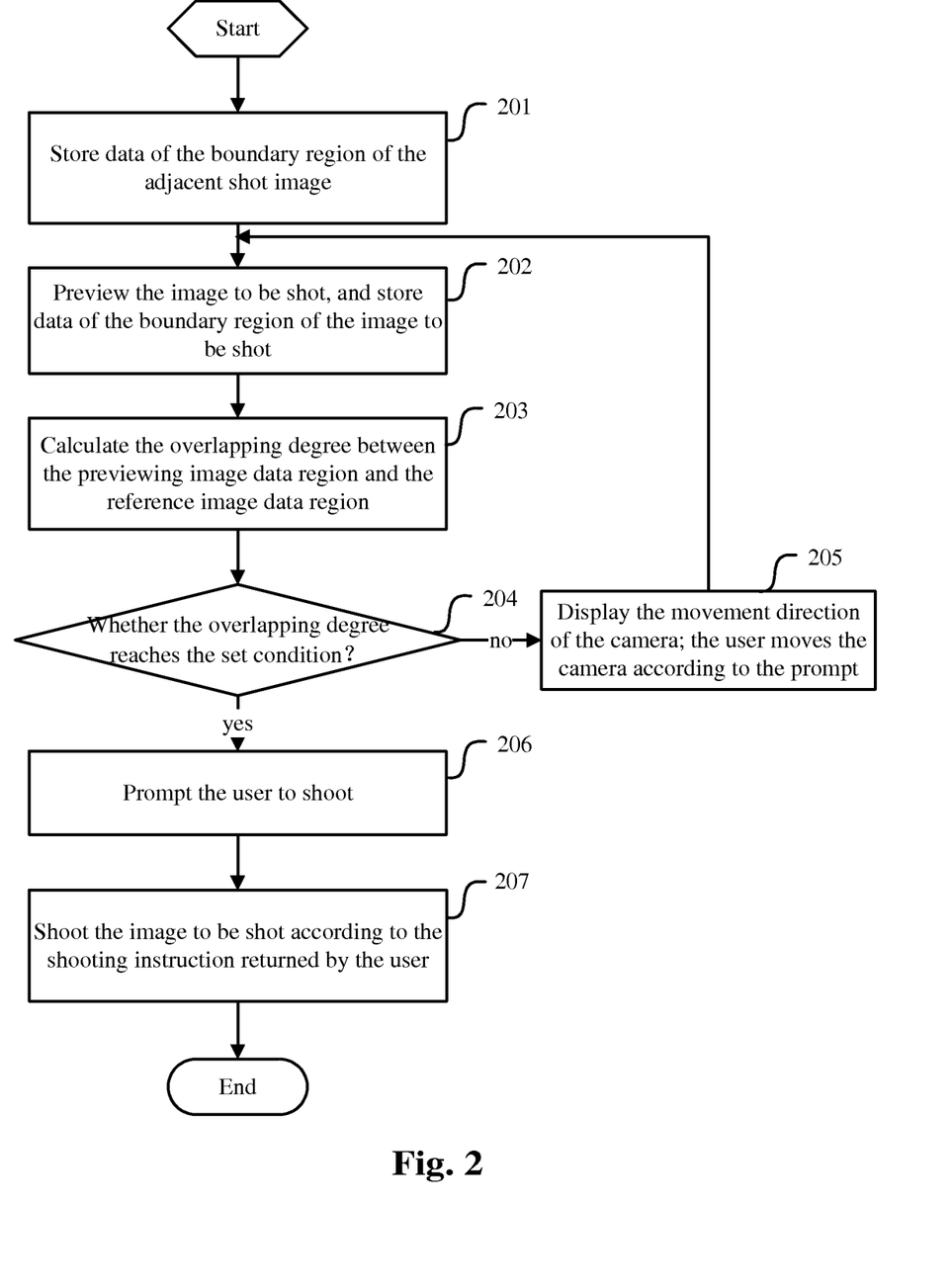
FIG. 2 shows a detailed implementing process of a method for shooting images to be shot according to an embodiment of the present invention.

Embodiment 1 is the implementation method during the shooting process when an alignment direction is not changed, for example, the alignment direction is set as a longitudinal alignment, and a shooting direction is from down to up. FIG. 2 shows the flow chart for implementing the method for shooting an image to be shot provided by the embodiment of the present invention; as shown in the figure, the step of shooting the image to be shot comprises the steps as follows.

Step 201: data of a boundary region of an adjacent shot image are stored.

The mobile terminal drives a camera to shoot a shooting object. Data of the upper boundary region of the previous shot image (i.e. the last shot image) are stored in a storage unit of the mobile phone in a picture format as the reference image data region.

Step 202: the image to be shot is previewed, and the data of the boundary region of the image to be shot are stored.

During the process of previewing the image to be shot, the data of the lower boundary region of the image to be shot are stored in real time in the storage unit of the mobile phone in a picture format according to the alignment direction as the previewing image data region.

Step 203: the overlapping degree between the previewing image data region and the reference image data region is calculated.

The mobile terminal calculates the overlapping degree between the previewing image data region and the reference image data region according to an image recognition algorithm.

Step 204: it is judged whether the overlapping degree reaches a set condition, if so, turn to the Step 206, and otherwise turn to the Step 205.

The overlapping degree can be set according to the pixel of the mobile terminal; when the pixel of the mobile terminal is higher, the overlapping degree may be set to be lower; and when the pixel of the mobile terminal is lower, the overlapping degree may be set to be higher.

Step 205: the movement direction of the camera is displayed; the user moves the camera according to the prompt; and turn to the Step 202.

The mobile terminal displays the movement direction of the camera; and the user moves the camera according to the prompt of the mobile terminal.

Step 206: the user is prompted to shoot.

Step 207: the image to be shot is shot according to the shooting instruction returned by the user.

The user presses the shooting key of the mobile terminal to shoot the image to be shot and store the shot image in the storage unit of the mobile phone.

According to the embodiment of the present invention, during the shooting process, the alignment direction is kept constant, the data of the boundary region of the previous shot image are defaulted as the reference data of the next image to be shot so as to ensure that the joining region of the images after the shooting are overlapped, and the left boundaries and the right boundaries of the shot images are respectively on the same vertical line, therefore they can be directly combined into a panorama without post-shooting processing.

Embodiment 2

This embodiment is the implementation method when the alignment direction is changed during the shooting process based on Embodiment 1. If the user needs to change the alignment direction in the shooting process, for example, on the basis of Embodiment 1, after shooting all the photographs at the longitudinal direction, the alignment direction is set as the horizontal alignment to continue shooting, and the shooting direction is from left to right, then the method comprises the steps as follows.

The data of the right boundary region of the last shot image are stored as the reference image data region; when previewing the image to be shot, the data of the left boundary of the image to be shot are stored as the previewing image data region.

Or, one image is selected from the shot images as the adjacent shot image; the data of the right boundary region of the shot image are stored as the reference image data region; when previewing the image to be shot, the data of the left boundary of the image to be shot are stored as the previewing image data region; then, the steps performed are the same as the Step 203-Step 207, and are not repeated here. After shooting the photograph which needs to be shot this time, the user can change the alignment direction as the longitudinal alignment. After shooting all the photographs of this round on the longitudinal direction, the user can also continue to shoot the photographs on the horizontal direction. The shooting of all the photographs to be shot is completed by many rounds of shooting.

The embodiment of the present invention changes the alignment direction during the shooting process based on Embodiment 1. During the shooting process, the previous shot image is defaulted as the adjacent shot image; or one shot image is selected as the adjacent shot image according to requirements. After completing the shooting of all the photographs to be shot by many times of shooting, the user can combine the shot images into a panorama by two-dimensional stitching.

Embodiment 3

Figure 3:
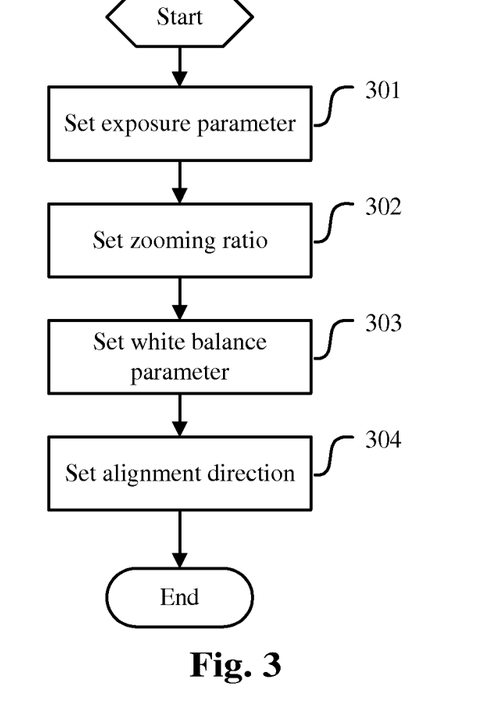
FIG. 3 shows a schematic flow chart of setting shooting parameters according to an embodiment of the present invention.

The embodiment is the implementation process that the mobile terminal sets shooting parameters of a panorama mode before shooting the photographs based on Embodiment 1. The FIG. 3 shows the flow diagram for setting the shooting parameters; as shown in the figure, when the mobile terminal sets the shooting parameters, it comprises the steps as follows.

Step 301, an exposure parameter is set.

The mobile terminal sets the exposure parameter according to brightness of the shooting object.

Step 302, a zooming ratio is set.

During the process of the mobile terminal setting the zooming ratio, if the focal distance is overlarge, the visual angle is relatively small, and too many photographs need to be shot; if the focal distance is over-small, the edge of the shot photograph is seriously deformed. Therefore, in the embodiment of the present invention, the zooming ratio used is an intermediate value of the zooming range provided by the mobile terminal, and the zooming ratio is neither the maximum zooming ratio nor non-zooming. In the available range, the user selects a suitable zooming ratio according to the distance of the specific sceneries.

Step 303, a white balance parameter is set.

The white balance parameter set by the mobile terminal is relevant to the environment condition during shooting, and the mode is usually set as a cloudy mode or a certain specific mode.

Step 304, the alignment direction is set.

The mobile terminal sets the alignment direction according to shooting requirements; the alignment direction is classified into horizontal alignment and longitudinal alignment.

Figure 4:
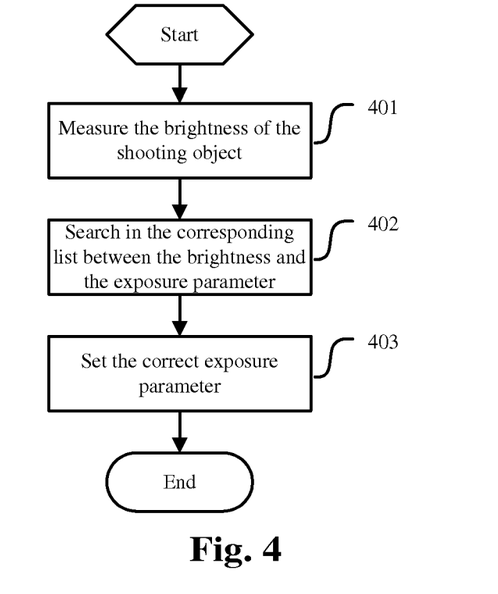
FIG. 4 shows a schematic flow chart of setting exposure parameters according to an embodiment of the present invention.

The FIG. 4 shows the flow diagram for setting the exposure parameter by the mobile terminal; as shown in the figure, the step of the mobile terminal setting the exposure parameter comprises the following steps:

Step 401, a brightness of a shooting object is measured;

Step 402, searching is performed in a corresponding list between the brightness and the exposure parameter;

Step 403, the correct exposure parameter is set.

Specifically, before shooting a photograph to be shot, the corresponding list between the brightness and the exposure parameter is stored, wherein the corresponding list between the brightness and the exposure parameter comprises the brightness and the corresponding exposure parameter thereof. When setting the exposure parameter, firstly, the brightness of the shooting object is measured, then searching is performed in the corresponding list between the brightness and the exposure parameter, and the exposure parameter is set according to the measured brightness of the shooting object.

According to the embodiment of the present invention, the shooting parameters of a panorama mode are set before shooting. During the shooting process, the focal distance and the exposure parameter are kept constant, and the white balance is fixed, so that the shot images are uniform in colour, brightness and resolution. After the alignment direction is set, the shot images are on the same line, thereby reducing the cutting loss when composing the panorama in a post-shooting stage.

In order to better understand the embodiments of the present invention, the implementation of the method for shooting a panorama is described based on the example of taking the boundary region as one quarter of the shot image/ image to be shot, and taking the mobile terminal as a mobile phone.

Figure 5:
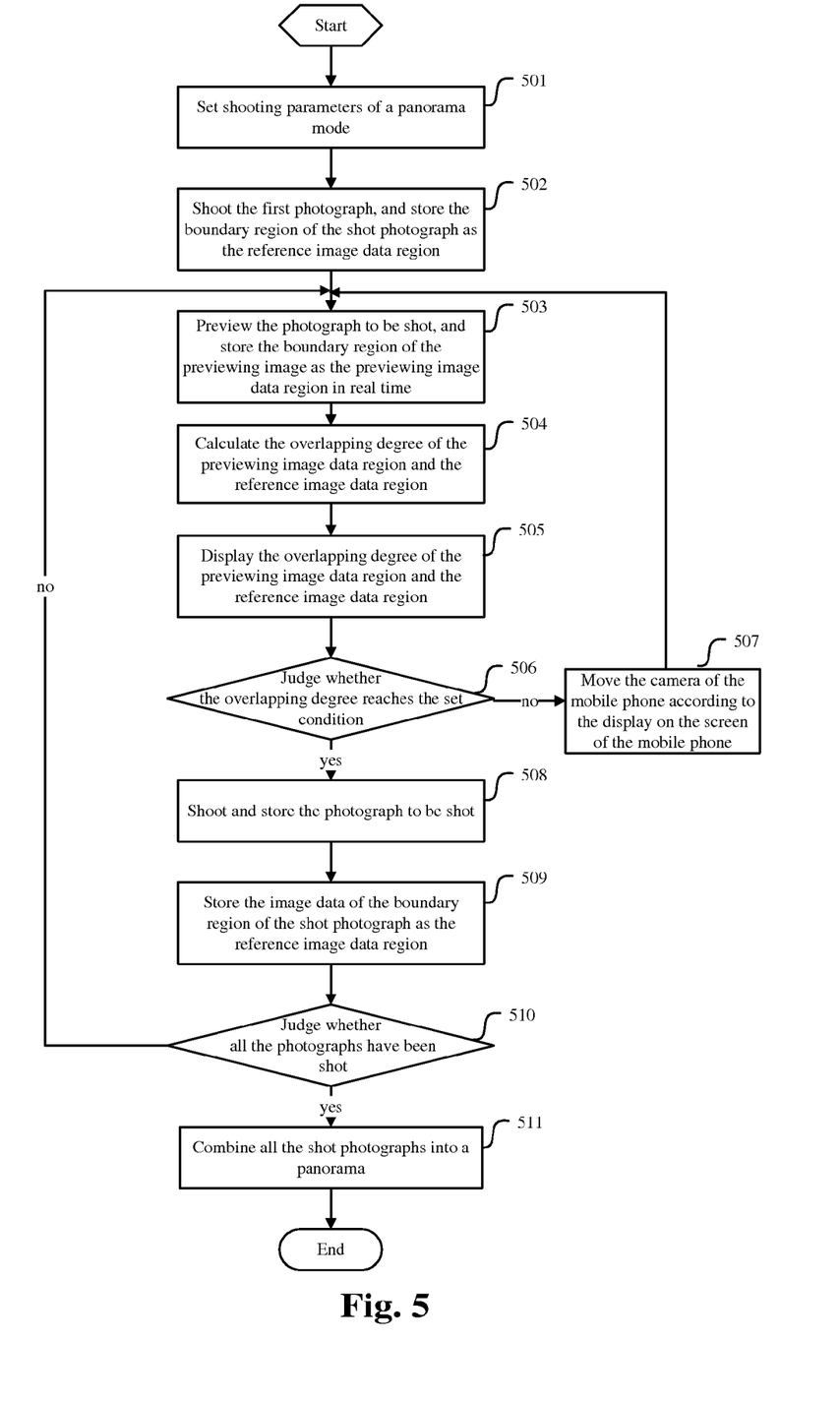
FIG. 5 shows a schematic diagram of an implementing flow of a method for shooting a panorama on a mobile phone according to an embodiment of the present invention.

FIG. 5 shows the schematic diagram for an implementing flow of the method for shooting a panorama on a mobile phone, as shown in the figure, the steps as follows are comprised when shooting the panorama.

Step 501: shooting parameters of a panorama mode are set.

Specifically, when setting the shooting parameters of the panorama mode in the mobile phone, a correct exposure parameter can be set by measuring a brightness of a shooting object and then searching in a corresponding lift between the brightness and the exposure parameter; a focal distance parameter can be set as a certain parameter in the zooming range provided by the mobile phone which is neither the maximum zooming ratio nor non-zooming; a white balance parameter can be set as a cloudy mode. The above three parameters are constant in the shooting process. The user sets the alignment direction of the mobile phone according to requirements, and the alignment direction can be classified into horizontal alignment and longitudinal alignment.

Step 502: the first photograph is shot, and a boundary region of the shot photograph is stored as a reference image data region.

Specifically, the first photograph is shot by pressing the shooting key of the mobile phone. The boundary region which occupies one quarter of the shot photograph is stored in the storage unit of the mobile phone in a picture format as the reference image data region according to the set alignment direction.

Step 503: a photograph to be shot is previewed, and the boundary region of the previewing image is stored in real time as a previewing image data region.

Specifically, the photograph to be shot is previewed from a preview frame of the mobile phone. During the process of previewing, the boundary region which occupies one quarter of the previewing image is stored in the storage unit of the mobile phone in a picture format as the previewing image data region according to the set alignment direction.

Step 504: an overlapping degree of image data of the previewing image data region and the reference image data region is calculated.

Specifically, the camera of the mobile phone transmits the image information to a central processing unit via a bus, and the central processing unit controls an image processing unit to calculate the overlapping degree of the previewing image data region and the reference image data region.

Step 505: the overlapping degree of the previewing image data region and the reference image data region is displayed.

Specifically, the screen of the mobile phone displays the movement direction and the movement amount of the camera of the mobile phone by using friendly marks of four directions of up, down, left and right which floats on the photograph to be shot.

Step 506: it is judged whether the overlapping degree between the previewing image data region and the reference image data region reaches the set condition, if so, turn to the Step 508, otherwise, turn to the Step 507.

Step 507: the camera of the mobile phone is moved according to the display on the screen of the mobile phone.

Specifically, the user moves the camera according to the movement direction of the camera prompted by the screen of the mobile phone.

Step 508: the photograph to be shot is shot and stored.

Specifically, the user presses the shooting key of the mobile phone to shoot the photograph to be shot according to the prompt of the screen of the mobile phone, and stores the shot photograph in a non-volatile memory of the mobile phone.

Step 509: the image data of the boundary region of the photograph shot this time are stored as the reference image data region.

Specifically, the boundary region which occupies one quarter of the photograph shot this time is stored in the storage unit of the mobile phone in a picture format as the reference image data region according to the set alignment direction.

Step 510: it is judged whether all the photographs are shot, if so, turn to the Step 511, otherwise, turn to the Step 503.

Step 511: all the shot photographs are combined into a panorama.

Specifically, the user combines the shot photographs into the panorama in an overlapping way after shooting all the photographs.

Based on the same conception, the embodiments of the present invention also provide an apparatus for shooting a panorama. As the theory of the apparatus to solve the problems is similar to that of the method for shooting a panorama, the implementation of the apparatus can refer to the implementation of the method, it is unnecessary to describe the repetitive steps.

Figure 6:
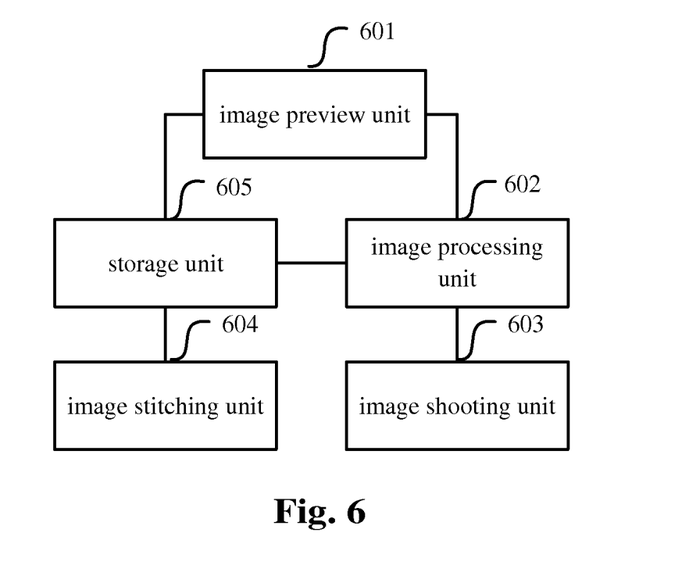
FIG. 6 shows a structural diagram of a shooting apparatus according to an embodiment of the present invention.

FIG. 6 shows a structural diagram of the shooting apparatus; as shown in the figure, the shooting apparatus comprises:

an image preview unit 601 used for previewing an image to be shot;

an image processing unit 602 used for calculating an overlapping degree of a joining region between the image to be shot and a shot image, wherein the boundary region is the joining region of the image to be shot and the shot image;

an image shooting unit 603 used for shooting the image to be shot when the overlapping degree reaches a set condition; and an image stitching unit 604 used for combining stored shot images into a panorama.

In the implementation, the panoramic shooting apparatus further comprises:

a storage unit 605 used for storing the boundary region of the image to be shot while previewing the image to be shot.

The image processing unit is further used for obtaining previously stored data of the boundary region of the adjacent shot image, and calculating the overlapping degree according to the data of the two boundary regions utilizing an image recognition method.

In the implementation, the image preview unit is used for prompting a movement direction of a camera to the user, and further used for previewing the image to be shot after the movement of the camera; the image processing unit is further used for recalculating the overlapping degree of the joining region between the boundary region of the image to be shot after the movement and the shot image.

In the implementation, the image preview unit is further used for prompting the user to shoot when the overlapping degree reaches the set condition.

The image shooting unit is used for shooting the photograph according to a shooting instruction returned by the user.

According to the above embodiments, compared with the prior art, the technical solution provided by the present invention is as follows. In the shooting process of a panorama, when the image to be shot is previewed, the overlapping degree between data of the boundary region of the image to be shot and data of the boundary region of the adjacent shot image is calculated; the movement direction of the camera is prompted to the user; when the overlapping degree reaches the set condition, the user is prompted to shoot the photograph; and the image is shot according to the shooting instruction returned by the user, thereby realizing that the boundary regions of the adjacent shot images are overlapped, so that the images with high quality can be obtained in a shooting process, after finishing shooting, because the obtained images are overlapped, the shot images can be directly combined into the panorama by simple overlapping without post-shooting processing.

Obviously, those skilled in the art can change and modify the present invention without separating from the spirit and range of the present invention; if the change and modification of the present invention belong to the scope of the claims of the present invention and the equivalent technologies, the present invention also intends to contain the change and the modification.

What is claimed is:

1. A method for shooting a panorama, the method comprising the steps of:
   calculating, when previewing an image to be shot which is not the first shot image in a panorama, an overlapping degree of a joining region between the image to be shot and a shot image; and
   evaluating whether the overlapping degree reaches a set condition;
   when the overlapping degree does not reach the set condition, prompting a movement direction of a camera to a user, previewing an image to be shot after a movement of the camera, and recalculating an overlapping degree of a joining region between a boundary region of the image to be shot after the movement and the shot image;
   shooting the image to be shot when the overlapping degree reaches a set condition;
   wherein when the panorama is shot in a digital zooming manner, storing the part which is cut and not displayed because of the digital zooming manner; when calculating the overlapping degree of the joining region between the image to be shot and the shot image, the part which is cut and non-displayed is used as hidden overlapping region for contrast and reference;
   wherein the joining region is determined by an alignment direction specified by a user;
   combining all the shot images into a panorama.

2. The method according to claim 1, wherein when previewing the image to be shot, the method comprises the step of: storing data of a boundary region of the image to be shot;
   the step of calculating the overlapping degree of the joining region between the image to be shot and the shot image comprises: obtaining previously stored data of a boundary region of an adjacent shot image; and calculating the overlapping degree according to the data of the two boundary regions utilizing an image recognition method.

3. The method according to claim 2, wherein the adjacent shot image is selected from multiple shot images.

4. The method according to claim 1, wherein when the overlapping degree reaches the set condition, the step of shooting the image to be shot comprises:
   prompting a user to shoot when the overlapping degree reaches the set condition; and
   shooting the image according to a shooting instruction returned by the user.

5. The method according to claim 1, wherein when the overlapping degree reaches the set condition, the step of shooting the image to be shot comprises:
   prompting a user to shoot when the overlapping degree reaches the set condition; and
   shooting the image according to a shooting instruction returned by the user.

6. An apparatus for shooting a panorama, the apparatus comprising:
   an image preview unit configured to preview an image to be shot under a panorama shooting mode;
   an image processing unit, coupled with the image preview unit, configured to calculate when the image to be shot has an adjacent shot image, an overlapping degree of a joining region between the image to be shot and the shot image;
   an image shooting unit, coupled with the image processing unit, configured to shoot the image to be shot when the overlapping degree reaches a set condition; and
   an image stitching unit, configured to combine shot images into a panorama;
   wherein the image processing unit is configured to evaluate whether the overlapping degree reaches a set condition;
   wherein when the overlapping degree does not reach the set condition: the image preview unit is configured to prompt a movement direction of a camera to a user and is configured to preview an image to be shot after a movement of the camera; and the image processing unit is configured to recalculate an overlapping degree of a joining region between a boundary region of the image to be shot after the movement and the shot image;
   wherein the joining region is determined by an alignment direction specified by a user;
   wherein when the panorama is shot in a digital zooming manner, the apparatus is configured to store the part which is cut and not displayed because of the digital zooming manner; when calculating the overlapping degree of the joining region between the image to be shot and the shot image, the image processing unit is configured to use the part which is cut and non-displayed as hidden overlapping region for contrast and reference.

7. The apparatus according to claim 6, further comprising:
   a storage unit, coupled with the image preview unit, for storing data of a boundary region of the image to be shot when the image to be shot is previewed;
   when the image to be shot has the adjacent shot image, the image processing unit is further used for obtaining previously stored data of a boundary region of the adjacent shot image, and calculating the overlapping degree according to the data of the two boundary regions utilizing an image recognition method.

8. The apparatus according to claim 6, wherein the image processing unit is further used for selecting the adjacent shot image from multiple shot images.

9. The apparatus according to claim 6, wherein the image preview unit is further used for prompting a user to shoot when the overlapping degree reaches the set condition; the image shooting unit is used for shooting the image according to a shooting instruction returned by the user.

10. The apparatus according to claim 6, wherein the image preview unit is further used for prompting a user to shoot when the overlapping degree reaches the set condition; the image shooting unit is used for shooting the image according to a shooting instruction returned by the user.

* * * * *